(12) United States Patent
Ishida et al.

(10) Patent No.: US 9,054,365 B2
(45) Date of Patent: Jun. 9, 2015

(54) NEGATIVE ACTIVE MATERIAL FOR RECHARGEABLE LITHIUM BATTERY AND RECHARGEABLE LITHIUM BATTERY

(75) Inventors: Sumihito Ishida, Yongin-si (KR); Kyeu-Yoon Sheem, Yongin-si (KR); Eui-Hwan Song, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 580 days.

(21) Appl. No.: 13/074,316

(22) Filed: Mar. 29, 2011

(65) Prior Publication Data

US 2012/0107693 A1    May 3, 2012

(30) Foreign Application Priority Data

Oct. 27, 2010  (KR) ........................ 10-2010-0105406

(51) Int. Cl.
| | |
|---|---|
| H01M 4/134 | (2010.01) |
| H01M 4/58 | (2010.01) |
| C01B 31/36 | (2006.01) |
| H01M 4/38 | (2006.01) |
| H01M 4/583 | (2010.01) |
| H01M 4/36 | (2006.01) |
| H01M 10/052 | (2010.01) |
| H01M 4/1395 | (2010.01) |
| H01M 4/04 | (2006.01) |

(52) U.S. Cl.
CPC ............ *H01M 4/134* (2013.01); *H01M 4/0421* (2013.01); *H01M 4/386* (2013.01); *H01M 4/583* (2013.01); *C01B 31/36* (2013.01); *Y02E 60/122* (2013.01); *H01M 4/366* (2013.01); *H01M 4/58* (2013.01); *H01M 10/052* (2013.01)

(58) Field of Classification Search
CPC ....................................................... H01M 4/134
USPC .......................................................... 429/217
See application file for complete search history.

(56) References Cited

U.S. PATENT DOCUMENTS

| | | | |
|---|---|---|---|
| 6,733,922 B2 | 5/2004 | Matsubara et al. | |
| 2006/0003227 A1 | 1/2006 | Aramata et al. | |
| 2006/0099507 A1* | 5/2006 | Kogetsu et al. | 429/218.1 |
| 2007/0054190 A1* | 3/2007 | Fukui et al. | 429/218.1 |

(Continued)

FOREIGN PATENT DOCUMENTS

| | | |
|---|---|---|
| JP | 2948206 | 7/1999 |
| JP | 2003-308837 | 10/2003 |

(Continued)

OTHER PUBLICATIONS

IDPL Machine Translation of JP 2007207466 A, published Aug. 2007.*

(Continued)

*Primary Examiner* — Barbara Gilliam
*Assistant Examiner* — Robert S Carrico
(74) *Attorney, Agent, or Firm* — Robert E. Bushnell, Esq.

(57) ABSTRACT

A negative active material for a rechargeable lithium battery and a rechargeable lithium battery including the same. The active material includes a silicon-containing compound represented by the following Chemical Formula 1 where Si exists with a concentration gradient from the surface to the center of the negative active material:

$$SiC_x \quad \text{[Chemical Formula 1]}$$

where 1, $0.05 \leq x \leq 1.5$.

9 Claims, 3 Drawing Sheets

(56) References Cited

U.S. PATENT DOCUMENTS

| | | |
|---|---|---|
| 2007/0207381 A1 | 9/2007 | Ohtsuka et al. |
| 2008/0176132 A1* | 7/2008 | Hirose et al. ............... 429/163 |
| 2009/0029256 A1 | 1/2009 | Mah et al. |
| 2009/0061319 A1* | 3/2009 | Kim et al. .................... 429/220 |

FOREIGN PATENT DOCUMENTS

| | | |
|---|---|---|
| JP | 2007207466 A * | 8/2007 |
| KR | 10-2002-0003742 | 1/2002 |
| KR | 2002-0070764 | 9/2002 |
| KR | 10-2006-0048656 | 5/2006 |
| KR | 1020060074808 | 7/2006 |
| KR | 1020060118962 | 11/2006 |
| KR | 1020090011888 | 2/2009 |

OTHER PUBLICATIONS

Korean Notice of Allowance issued Apr. 30, 2012 in connection with Korean Patent Application Serial No. 10-2010-0105406 and Request for Entry of the Accompanying Office Action attached herewith.

* cited by examiner

NEGATIVE ACTIVE MATERIAL FOR RECHARGEABLE LITHIUM BATTERY AND RECHARGEABLE LITHIUM BATTERY

RELATED APPLICATIONS

This application claims priority to and the benefit of Korean Patent Application No. 10-2010-0105406 filed in the Korean Intellectual Property Office on Oct. 27, 2010, the entire contents of which are incorporated herein by reference.

BACKGROUND

1. Field

This disclosure relates to a negative active material for a rechargeable lithium battery and a rechargeable lithium battery including the same.

2. Description of the Related Art

Lithium rechargeable batteries have recently drawn attention as a power source for small portable electronic devices. They use an organic electrolyte solution and thereby, have twice higher the discharge voltage than a conventional battery using an alkali aqueous solution, and accordingly, have high energy density.

As for positive active materials of a rechargeable lithium battery, there has been research on a lithium-transition element composite oxide that can intercalate lithium, such as $LiCoO_2$, $LiMn_2O_4$, $LiNi_{1-x}Co_xO_2$ (0<x<1), and so on.

On the other hand, negative active materials of a rechargeable lithium battery have included various carbon-based materials such as artificial graphite, natural graphite, and hard carbon, which can all intercalate and deintercalate lithium ions.

In addition, as a battery is increasingly required to have high energy density, much attention is drawn to a material that can be alloyed with lithium, for example, Si, Sn, Ge, oxides thereof, and alloys thereof, as a negative active material with high theoretical capacity density. In particular, a Si oxide has good cycle-life characteristics, and has been widely researched. However, the Si oxide has a problem that oxygen reacts with lithium (Li) and thus forms $Li_2O$ (lithium oxide). Accordingly, it may not only increase irreversible capacity but may also deteriorate energy density of a battery in order to compensate lithium. Furthermore, the $Li_2O$ that does not participate in charge and discharge expands an electrode and may deteriorate energy density. Therefore, it is possible to improve energy density without such compensation of lithium. In addition, since the $Li_2O$ include an alkali component, it reacts with an electrolyte particularly at a high temperature atmosphere and thereby may bring about a problem of generating gas, deteriorating capacity, and the like.

SUMMARY

One exemplary embodiment of the present invention provides a negative active material for a rechargeable lithium battery having high energy density and excellent initial charge and discharge efficiency and cycle-life characteristics.

Another embodiment of the present invention provides a rechargeable lithium battery including the negative active material.

According to one embodiment of the present invention, a negative active material for a rechargeable lithium battery is provided that includes a silicon-containing compound represented by the following Chemical Formula 1:

$SiC_x$ [Chemical Formula 1]

where 1, $0.05 \leq x \leq 1.5$. wherein carbon and silicon has a relationship of a concentration ratio satisfying the Equation 1:

$$A \leq B \quad \text{[Equation 1]}$$

where A is a mole concentration ratio of carbon relative to silicon in the center of the negative active material; and B is a mole concentration ratio of carbon relative to silicon on the surface area of the negative active material.

The x may be in a range from 0.25 to 0.95.

The silicon exists with a concentration gradient from the surface area to the center of the negative active material.

In one embodiment of the present invention, the A may be $0.5 \leq A \leq 1.7$, and the B may be $0.03 \leq B \leq 0.9$.

The silicon-containing compound may be amorphous.

The silicon-containing compound may further include a carbon layer on the surface. Also, the carbon layer may be included in an amount ranging from 5 wt % to 20 wt % based on the total weight of the silicon-containing compound and the carbon layer.

According to one embodiment of the present invention, a rechargeable lithium battery is provided that includes a negative electrode including the negative active material, a positive electrode including a positive active material, and a non-aqueous electrolyte.

Hereinafter, further embodiments of the present invention will be described in detail.

The negative active material for a rechargeable lithium battery according to the present invention has high energy density, excellent initial charge and discharge efficiency and cycle-life characteristic.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
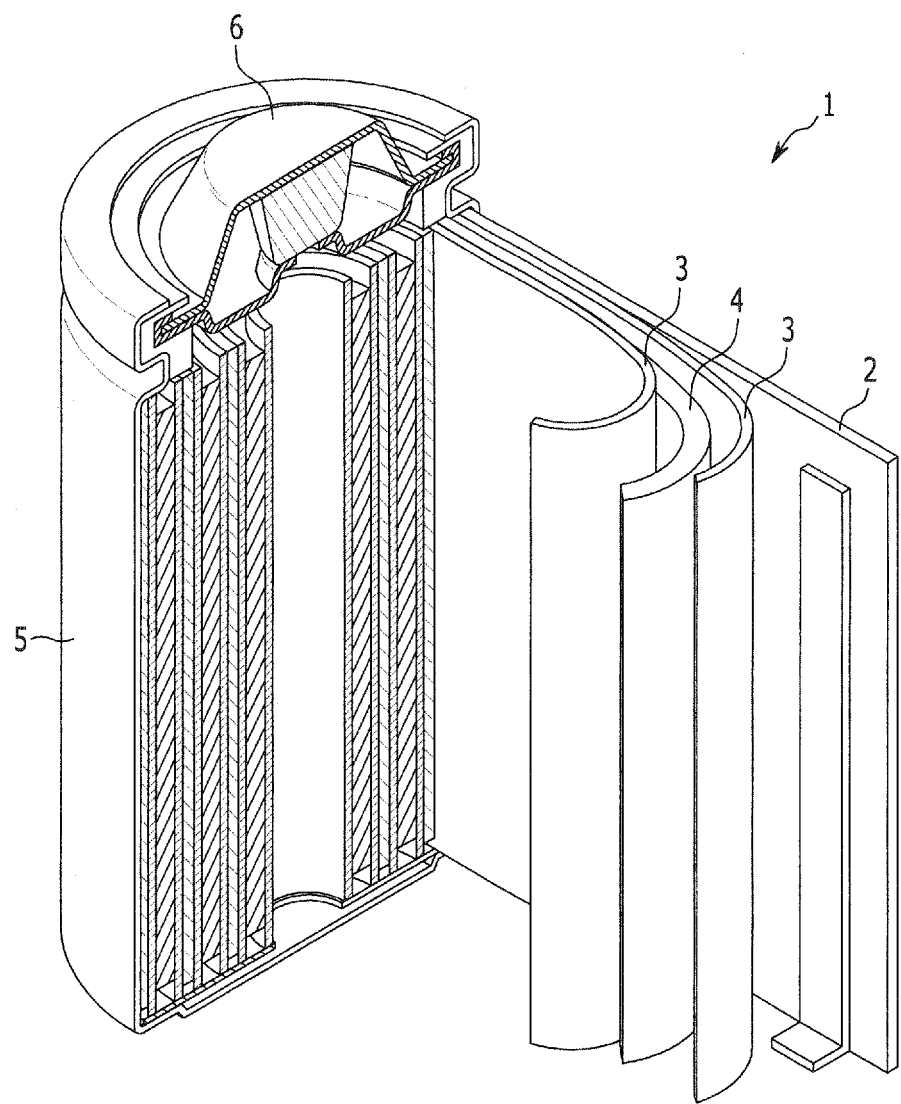
FIG. 1 shows the structure of a rechargeable lithium battery according to one embodiment of the present invention.

Exemplary embodiments will hereinafter be described in detail. However, these embodiments are only exemplary, and the present invention is not limited thereto.

In the present specification, the negative active material may be a negative active material in a form of a particle, and also, it may be a negative active material in a form of a layer that is formed by a physical method such as a sputtering on a substrate. Therefore, even though the negative active material is formed in any kind of shape, any negative active material satisfying the following requirements may fall within the scope of the present invention. In the present specification and claims, when the negative active material has the particle shape, the center refers to the center of a particle, while when it has the layer shape, the center refers to the border contacting a substrate, and the surface refers to the opposite side to the border. The surface area refers to a 20% depth in a direction from the surface to the center based on 100% of the diameter, the length, or the thickness of the negative active material.

According to one embodiment of the present invention, a negative active material for a rechargeable lithium battery includes a silicon-containing compound represented by the following Chemical Formula 1 where Si exists with a concentration gradient from the surface to the center of the negative active material.

$SiC_x$ [Chemical Formula 1]

In Chemical Formula 1, 0.05≤x≤1.5. The x ranges from about 0.25 to about 0.95. When the x is under 0.05, the room temperature and high temperature cycle-life characteristics may be deteriorated by cracking of particles due to the weaken covalent bonds between silicon and carbon. Whereas, when the x is over 1.5, it is hard to form a silicon-containing compound that is relatively stable, and also, it may deteriorate the capacity by preventing reactions of intercalate and deintercalate lithium ions.

Since the silicon-containing compound represented by the above Chemical Formula 1 does not include oxygen, and the carbon included in the silicon-containing compound does not react with Li and does not produce $Li_2O$, so that the negative active material may not be expanded and may also not incur side reactions between $Li_2O$, a strong alkali and an electrolyte.

The silicon-containing compound is a compound of silicon (Si) covalently bonded with carbon (C), which may exclude a physical mixture of silicon and carbon. The covalent bond between silicon and carbon in a silicon-containing compound according to one embodiment of the present invention may be identified from peaks between 740 $cm^{-1}$ to 780 $cm^{-1}$ at the FT-IR analysis. The silicon-containing compound does not have a peak when XRD analysis is performed using a CuK α at 35° to 38°.

On the contrary, there is no peak at the FT-IR analysis if carbon is not covalently bonded with silicon but are simply mixed with silicon as a mixture or composite, but have a peak at 35° to 38° when XRD analysis is performed using CuK α. Also, since silicon carbide including Si and C with an element ratio of 1:1 and having a diamond structure may have a crystalline structure, it may have a peak at 35° to 38° when XRD analysis is performed using CuK α.

Therefore, the silicon-containing compound according to one embodiment of the present invention is a compound of silicon covalently bonded with carbon, which may prevent cracking of particles.

In one embodiment, the concentration ratio of silicon (Si) existing with a concentration ratio gradient in the negative active material that includes the silicon-containing compound, may be, on the surface, equal to or higher than at the center. Carbon and silicon have a relationship of a concentration ratio satisfying the following Equation 1.

A≥B [Equation 1]

In Equation 1, A is a mole concentration ratio (C/Si mole ratio) of carbon relative to silicon in the center of the negative active material, and B is a mole concentration ratio (C/Si mole ratio) of carbon relative to silicon on the surface area of the negative active material.

In one embodiment of the present invention, the A may be 0.5≤A≤1.7, and the B may be 0.03≤B≤0.9.

When the concentration ratio of carbon and silicon of the negative active material satisfies the Equation 1, the expansion ratio at the center is lower than the expansion ratio at the surface while Li is intercalated in the active material. Therefore, it may prevent warping a negative active material particle during charge and discharge.

Resultantly, since the silicon-containing compound according to one embodiment of the present invention has a covalent bond between silicon and carbon and may control expansion of the center and the surface of the particle, it may control cracking of an active material particle. Further, compared with oxygen atom, the carbon atom included in the silicon-containing compound does not react with Li and does not produce $Li_2O$, an active material may not be expanded and may also not incur side reactions between $Li_2O$, a strong alkali and an electrolyte. Accordingly, cycle-life characteristics may be improved.

In the present specification and claims, the surface area refers to a 20% depth in a direction from the surface to the center based on 100% of the diameter, the length, or the thickness of the negative active material.

The silicon-containing compound may be amorphous. Since the silicon-based compound is amorphous, it may bring about excellent cycle-life characteristics and particularly excellent high temperature cycle-life characteristics of a rechargeable lithium battery.

The silicon-containing compound may further include the carbon layer on the surface, wherein the carbon layer may be included in an amount of 5 wt % to 20 wt % based on the total weight of the silicon-containing compound and the carbon layer. When a silicon-containing compound includes a carbon layer on the surface, in particular, the amount of a carbon layer within the range, it may further improve electrical conductivity. Accordingly, since a lithium rechargeable battery may be better charged and discharged, the silicon-based compound may more improve initial charge and discharge efficiency and cycle-life characteristics of the battery.

The carbon layer may have a thickness ranging from about 10 nm to about 50 nm. When it has a thickness within the range, the compound may uniformly obtain conductivity without deteriorating a capacity.

The carbon layer may include amorphous carbon, crystalline carbon, or a mixture thereof.

The silicon-containing compound may be prepared in a sputtering process using Si and C targets. The sputtering process may be appropriately adjusted to acquire a composition represented by the above Chemical Formula 1. For example, an output for a C target may be constantly maintained at 1500 W to 100 W, or it may be changed with a predetermined speed from 1500 W to 600 W to 1000 W to 100 W. Also, an output for a Si target may be constantly maintained at 1500 W to 100 W, or it may be changed with a predetermined speed from 1500 W to 600 W to 1000 W to 100 W. The sputtering condition of the output is not limited to the condition above.

The silicon-containing compound may be prepared in a plasma method. However, a composition represented by the above Chemical Formula 1 may be prepared in any method for preparing a silicon-based compound.

Another embodiment of the present invention provides a rechargeable lithium battery.

A rechargeable lithium battery may be classified into a lithium ion battery, a lithium ion polymer battery, and a lithium polymer battery, depending on kinds of a separator and an electrolyte. It also may be classified to be a cylindrical type, a prismatic type, a coin type, a pouch type, and the like, depending on shape. In addition, it may be a bulk type and a thin film type, depending on size. The structure of these batteries and their manufacturing method are well-known in this field and may not be described in more detail here.

The rechargeable lithium battery according to another embodiment of the present invention includes a negative electrode including the negative active material according to one embodiment of the present invention, a positive electrode including a positive active material, and a non-aqueous electrolyte.

The negative electrode includes a negative active material layer including a negative active material and a current collector. Herein, the negative active material layer may be disposed by sputtering a negative active material to be a thin film on a current collector, or by adding a negative active material to a solvent to prepare a slurry-type negative active material composition, and then coating the negative active material composition on a current collector.

The sputtering process may not need a binder for binding a negative active material to a current collector.

The latter method of preparing an active material composition and coating it may further include a binder added to the negative active material composition. When a binder is added to the negative active material composition, the binder may be included in an amount ranging from 1 wt % to 5 wt % based on the entire weight of the negative active material layer.

The binder improves properties of binding active material particles with one another and a negative active material with a current collector. The binder may include a non-water-soluble binder, a water-soluble binder, or a combination thereof.

Examples of the non-water-soluble binder include polyvinylchloride, carboxylated polyvinylchloride, polyvinylfluoride, a polymer including an ethylene oxider, polyvinylpyrrolidone, polyurethane, polytetrafluoroethylene, polyvinylidene fluoride, polyethylene, polypropylene, polyamideimide, polyimide, and a combination thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used, a cellulose-based compound may be further included to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the binder.

In addition, the negative active material composition may further include a solvent. Examples of the solvent may include N-methylpyrrolidone. In addition, when the binder is water soluble, the solvent may include water, but is not limited thereto.

The current collector may be selected from the group consisting of a copper foil, a nickel foil, a stainless steel foil, a titanium foil, a nickel foam, a copper foam, a polymer substrate coated with a conductive metal, and combinations thereof.

The positive electrode includes a current collector and a positive active material layer disposed on the current collector. The positive active material includes a lithiated intercalation compound that reversibly intercalates and deintercalates lithium ions. The positive active material may include a composite oxide including at least one selected from the group consisting of cobalt, manganese, and nickel, as well as lithium. In particular, the following lithium-containing compounds may be used. $Li_aA_{1-b}X_bD_2$ ($0.90 \leq a \leq 1.8$, $0 \leq b \leq 0.5$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2PO_{43}$ ($0 \leq f \leq 2$); $Li_{(3-f)}Fe_2PO_{43}$ ($0 \leq f \leq 2$); and $LiFePO_4$ In the above formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The compound may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

The positive active material may be included in an amount ranging from about 90 wt % to about 98 wt % based on the total weight of the positive active material layer.

The positive active material layer also includes a binder and a conductive material. The binder and conductive material may be included in amounts of about 1 wt % to about 5 wt % based on the total weight of the positive active material layer, respectively.

The binder improves properties of binding positive active material particles among one another and also, the positive active material with a current collector. Examples of the binder include polyvinyl alcohol, carboxylmethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to attribute conductivity to an electrode. It may include any electrically conductive material, unless it causes a chemical change. Examples of the conductive material include a carbon-based material such as natural graphite, artificial graphite, carbon black, acetylene black, ketjen black, a carbon fiber, and the like; a metal-based material such as a metal powder, a metal fiber, or the like that includes copper, nickel, aluminum, silver, and the like; a conductive polymer such as a polyphenylene derivative; or a mixture thereof.

The current collector may be aluminum (Al) but is not limited thereto.

The positive electrode may be obtained by a general process including mixing a positive active material, a binder, and selectively a conductive material in a solvent to prepare an active material composition, coating the active material composition on a current collector, and drying and pressing the same. The positive electrode-manufacturing method is well known and thus is not described in detail in the present specification. The solvent includes N-methylpyrrolidone or the like, but is not limited thereto.

The non-aqueous electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent may be prepared by mixing a cyclic carbonate and a linear carbonate. The cyclic carbonate and the linear carbonate are mixed together in a volume ratio ranging from about 1:1 to about 1:9. When the mixture is used as an electrolyte, the electrolyte performance may be enhanced.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be represented by the following Chemical Formula 2.

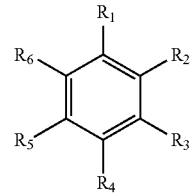

[Chemical Formula 2]

In Chemical Formula 2, $R_1$ to $R_6$ are independently selected from the group consisting of hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include an additive of a vinylene carbonate-based compound, an ethylene carbonate-based compound represented by the following Chemical Formula 3, or a combination thereof to improve cycle life.

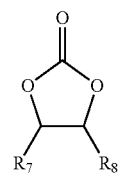

[Chemical Formula 3]

In Chemical Formula 3, $R_7$ and $R_8$ are independently selected from the group consisting of hydrogen, a halogen, a cyano group (CN), a nitro group ($NO_2$), and a C1 to C5 fluoroalkyl group, provided that at least one of $R_7$ and $R_8$ is selected from the group consisting of a halogen, a cyano group (CN), a nitro group ($NO_2$), and a C1 to C5 fluoroalkyl group, but both $R_7$ and $R_8$ are not hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive used to improve cycle life may be adjusted within an appropriate range.

The lithium salt is dissolved in an organic solvent and plays a role of supplying lithium ions in a battery, operating a basic operation of the rechargeable lithium battery, and improving lithium ion transportation between positive and negative electrodes therein. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

FIG. 1 is a schematic view showing the representative structure of a rechargeable lithium battery according to one embodiment. As shown in FIG. 1, the rechargeable lithium battery 1 includes a battery case 5 including a positive electrode 4, a negative electrode 2, and a separator 3 interposed between the positive electrode 4 and the negative electrode 2, an electrolyte solution impregnated therein, and a sealing member 6 sealing the battery case 5.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate the present invention in more detail. These examples, however, are not in any sense to be interpreted as limiting the scope of this disclosure.

EXAMPLE 1

2 μm-thick amorphous $SiC_x$ (x=0.65) layer was formed on a 20 μm-thick Cu foil using a two-sources sputtering apparatus, a Si target, and a C target through a sputtering process. Outputs for the Si target and the C target were respectively set to be 400 W and 200 W.

The concentration ratio, A (C/Si mole ratio), was 0.65 at the center of the $SiC_x$ (x=0.65) layer (near close by the Cu foil), and the concentration ratio, B (C/Si mole ratio) was 0.65 at a surface area, which was identified through XPS. The surface area was referred to be 20% of a depth in a direction from the surface to the Cu foil based on 100% thickness of the amorphous $SiC_x$ (x=0.65) layer.

The fabricated product including a $SiC_x$ (x=0.65) layer (negative active material layer) on a Cu foil was used as a negative electrode.

EXAMPLE 2

2 μm-thick amorphous $SiC_x$ (x=0.65) layer was formed according to the same method as Example 1, except that using a two-source sputtering apparatus, a Si target, and a C target, a sputtering process was performed on a 20 μm-thick Cu foil while keeping an output for a Si target to be 400 W and gradually changing an output for a C target from initial output 600 W to 100 W. The concentration ratio A(C/Si mole ratio) was 0.95 at the center of the $SiC_x$ (x=0.65) layer (close by the Cu foil), and the concentration ratio B (C/Si mole ratio) was 0.2 at a surface area. The surface area was referred to be 20% of a depth in a direction from the surface to the Cu foil based on 100% thickness of the amorphous $SiC_x$ (x=0.65) layer.

EXAMPLE 3

2 μm-thick amorphous $SiC_x$ (x=0.05) layer was formed according to the same method as Example 1, except that using a two-source sputtering apparatus, a Si target, and a C target, a sputtering process was performed on a 20 μm-thick Cu foil, while keeping an output for a Si target to be 600 W and gradually changing an output for a C target from initial output 100 W to 30 W. The concentration ratio A (C/Si mole ratio) was 0.1 at the center of the $SiC_x$ (x=0.05) layer (close by the Cu foil), and the concentration ratio B (C/Si mole ratio) was 0.03 at a surface area. The surface area was referred to be 20% of a depth in a direction from the surface to the Cu foil based on 100% thickness of the amorphous $SiC_x$(x=0.05) layer.

EXAMPLE 4

2 μm-thick amorphous $SiC_x$ (x=1.5) layer was formed according to the same method as Example 1, except that using a two-source sputtering apparatus, a Si target, and a C target a sputtering process was performed on a 20 μm-thick Cu foil while keeping an output for a Si target to be 200 W and gradually changing an output for a C target from initial output 1200 W to 600 W.

The concentration ratio A(C/Si mole ratio) was 1.7 at the center of the $SiC_x$ (x=1.5) layer (close by the Cu foil), and the concentration ratio B(C/Si mole ratio) was 1.0 at the surface area. The surface area was referred to be 20% of depth in a direction from the surface to the Cu foil based on 100% thickness of the amorphous $SiC_x$ (x=1.5) layer.

EXAMPLE 5

Si was evaporated through 500 mA electron beam using a plasma spray, and the evaporated Si vapor was sprayed using a Si nozzle along with an argon gas (1 L/min). Then, the evaporated Si gas and a methane gas were reacted by emitting 2.0 L/min, 1.0 L/min, and 0.5 L/min methane gas from three methane gas nozzles disposed with 20 cm intervals each other from the Si nozzle. As a result, an amorphous $SiC_x$ (x=0.7) particle having a spherical shape and size of about 5 μm or less was prepared. The concentration ratio A (C/Si mole ratio) was 0.92 at the center of the $SiC_x$ (x=0.7) layer, and the concentration ratio B (C/Si mole ratio) was 0.25 at the surface area. The surface area was referred to be 20% of depth in a direction from the surface to the Cu foil based on 100% thickness of the amorphous $SiC_x$ (x=0.7) layer.

The amorphous $SiC_x$ (x=0.7) material was positioned on a quartz board, and the quartz board was positioned in the center of a tube furnace, and substituting the air in the tube furnace with an argon gas, then, filling the argon gas and increasing the temperature until 500° C. When the temperature was reached at 500° C., an argon gas including 20 volume % of a toluene gas instead of argon gas was filled and allowed to stand for 30 minutes, then the gas was changed to argon gas and was cooled to the room temperature. As a result, a negative active material coated a conductive carbon thereon (carbon layer) was prepared.

The carbon layer had a thickness of 20 nm and contained 5 wt % of the total weight of the amorphous $SiC_x$ (x=0.7) and the entire weight of the carbon layer.

COMPARATIVE EXAMPLE 1

A $SiO_x$ (x=1.0) layer was disposed on a 20 μm-thick Cu foil by radiating an electron beam (EB) to Si and $SiO_2$ targets in a thermal evaporator.

The product that the obtained $SiO_x$ (x=1.0) layer (the negative active material layer) was formed on a Cu foil was used as a negative electrode. Herein, the negative active material layer had a thickness of 2 µm. It is performed the same as Example 1 except for using the negative electrode.

COMPARATIVE EXAMPLE 2

2 µm-thick $SiC_x$ (x=1.6) layer was formed according to the same method as Example 1 using a two-source sputtering apparatus, a Si target, and a C target, a sputtering process was performed on a 20 µm-thick Cu foil while keeping an output for a Si target to be 200 W and gradually changing an output for a C target from initial output 1500 W to 1000 W.

COMPARATIVE EXAMPLE 3

2 µm-thick $SiC_x$ (x=0.02) layer was formed according to the same method as Example 1, except that using a two-source sputtering apparatus, a Si target, and a C target, a sputtering process was performed on a 20 µm-thick Cu foil while keeping an output for a Si target to be 700 W and gradually changing an output for a C target from initial output 50 W to 10 W.

COMPARATIVE EXAMPLE 4

2 µm-thick $SiC_x$ (x=0.65) layer was formed on a Cu foil using a two-source sputtering apparatus, a Si target, and a C target through a sputtering process by setting an output for a Si target be 400 W and gradually changing an output for a C target from initial output 100 W to 600 W. The concentration ratio A (C/Si mole ratio) was 0.2 at the center of the $SiC_x$ (x=0.65) layer, and the concentration ratio B (C/Si mole ratio) of silicon was 0.95 at the surface area. The surface area was referred to be 20% of depth in a direction from the surface to the Cu foil based on 100% thickness of the amorphous $SiC_x$ (x=0.65) layer.

COMPARATIVE EXAMPLE 5

A crystalline $SiC_x$ (x=0.7) material was prepared by heating the prepared amorphous $SiC_x$ (x=0.7) material obtained according to Example 5 at 1200° C. under an argon atmosphere.

The crystalline $SiC_x$ (x=0.7) material was positioned on a quartz board, and the quartz board was positioned in the center of a tube furnace, and substituting the air in the tube furnace with an argon gas, then, filling the argon gas and increasing the temperature until 500° C. When the temperature was reached at 500° C., an argon gas including 20 volume % of a toluene gas instead of argon gas was filled and allowed to stand for 30 minutes, then the gas was changed to argon gas and it was cooled to the room temperature. As a result, a negative active material coated a conductive carbon thereon (carbon layer) was prepared.

The carbon layer had a thickness of 20 nm and contained 5 wt % of the total weight of the amorphous $SiC_x$ (x=0.7) and the entire weight of the carbon layer.

Fabrication of Half-cell

The negative electrodes according to Examples 1 to 5 and Comparative Examples 1 to 5 were respectively used with a lithium metal counter electrode, fabricating a half-cell. The half-cells were measured regarding reversible capacity and initial efficiency. The results are provided in the following Table 1.

When the cells were charged at a 0.050 rate to 0V (vs. Li/Li$^+$), their capacities were measured as initial charge capacity. When they were discharged at a 0.050 rate to 1.5V (vs. Li/Li$^+$), their capacities were measured as initial discharge capacity. Then, initial efficiency was calculated as initial discharge capacity/initial charge capacity.

Fabrication of Rechargeable Lithium Battery Cell

A positive electrode was fabricated by mixing 95 wt % of LiCoO$_2$ as a positive active material, 3 wt % of polyvinylidene fluoride, and 2 wt % of acetylene black in an N-methylpyrrolidone solvent to prepare a positive active material slurry and coating the slurry on an Al foil.

The positive electrode was used with each negative electrode according to Examples 1 to 5 and Comparative Examples 1 to 5, fabricating rechargeable lithium battery cells. Herein, an electrolyte solution was prepared by dissolving 1.0M LiPF$_6$ in a mixed solvent of ethylene carbonate and diethyl carbonate in a volume ratio of 1:1.

The rechargeable lithium battery cells were charged at a 0.2 C to 4.2V and discharged at a 1.0 C to 3V at a temperature of 45° C., for 300 times.

When the cells were charged and discharged once, they were measured regarding discharge capacities. When charged and discharged 300 times, they were again measured regarding discharge capacities. Percentage values were then calculated by the discharge capacity at the 300$^{th}$ cycle to that at the first cycle, and are provided as cycle-life characteristics in the following Table 1.

TABLE 1

| | Negative active material | Properties | A | B | Capacity (mAh/g) | Efficiency (%) | 45° C., 300th cycle-life (%) |
|---|---|---|---|---|---|---|---|
| Example 1 | $SiC_x$ (x = 0.65) | amorphous | 0.65 | 0.65 | 2520 | 93 | 82 |
| Example 2 | $SiC_x$ (x = 0.65) | amorphous | 0.95 | 0.2 | 2650 | 95 | 89 |
| Example 3 | $SiC_x$ (x = 0.05) | amorphous | 0.1 | 0.03 | 2820 | 95 | 80 |
| Example 4 | $SiC_x$ (x = 1.5) | amorphous | 1.7 | 1.0 | 1020 | 82 | 93 |
| Example 5 | $SiC_x$ (x = 0.7) + carbon coating layer | amorphous | 0.92 | 0.25 | 2050 | 91 | 83 |
| Comparative Example 1 | $SiO_x$ x = 1 | amorphous | 1 | 1 | 1450 | 65 | 25 |
| Comparative Example 2 | $SiC_x$ (x = 1.6) | amorphous | 1.8 | 1.5 | 310 | 51 | 80 |
| Comparative Example 3 | $SiC_x$ (x = 0.02) | amorphous | 0.03 | 0.01 | 3350 | 98 | 5 |
| Comparative Example 4 | $SiC_x$ (x = 0.65) | amorphous | 0.2 | 0.95 | 2380 | 90 | 21 |
| Comparative Example. 5 | $SiC_x$ (x = 0.7) + carbon coating layer | crystalline | 0.92 | 0.25 | 315 | 61 | 28 |

As shown in Table 1, the rechargeable lithium battery cells respectively including the negative active materials according to Examples 1 to 5 had excellent capacity, efficiency, and cycle-life characteristics. Particularly, the rechargeable lithium battery cell including the negative active material according to Example 2 satisfying A>B condition of an internal composition and an external composition of an active material has released from the stress of an active material caused by expansion and shrinkage, and has excellent cycle-life characteristics.

Further, the current collector and the active material according to Example 5 are adhered by a binder, so that the adherence is reduced compared to Examples 1 to 4. However, it may control the cracks and expansion of a particle by coating a carbon layer on the surface of the active material to maintain the conductivity of the active material. Therefore, it may have excellent efficiency and cycle-life characteristics.

On the other hand, rechargeable lithium battery cells respectively including the negative active materials according to Comparative Examples 1, 3, 4 and 5 had deteriorated cycle-life characteristics. In particular, those of Comparative Example 3 had sharply deteriorated cycle-life characteristics. In addition, those of Comparative Example 2 had appropriate cycle-life but poor capacity and efficiency characteristics. The SiO negative active material of Comparative Example 1 had deteriorated initial efficiency, since lithium reacted with oxygen and thus produced $Li_2O$. In addition, an electrolyte solution was decomposed due to a $Li_2O$ catalyst, which is strongly alkali, and formed a layer on the surface of a negative electrode, which causes resistance.

The negative active material of Comparative Example 2 having the x value of 1.6, which was larger than 1.5, had remarkably deteriorated battery capacity.

In general, the smaller the x value, it has the higher capacity. When it does not include C as in Comparative Example 1, the covalent bond in the particle may be weakened, so that, the particle is broken due to the expansion and shrinkage caused by lithium intercalation and deintercalation. Therefore, it is hard to be commercialized because even a high capacity battery may have decreased cycle-life characteristics.

Since Li was intercalated inside of a particle rather than the surface, Comparative Example 4 having the condition of A<B may have quite large internal expansion. According to the internal expansion, Li was drawn off during the discharge, and it was hard to alleviate warp of the bulk. Therefore, whenever the active material had shrunken, it may cause cracking of a lot of particles. Further, as the active material was repeatedly expanded and contracted during the charge and discharge despite of a Si—C covalent bond therein, the negative active material was broken, so that current-collecting and cycle-life characteristics may be reduced.

Figure 2:
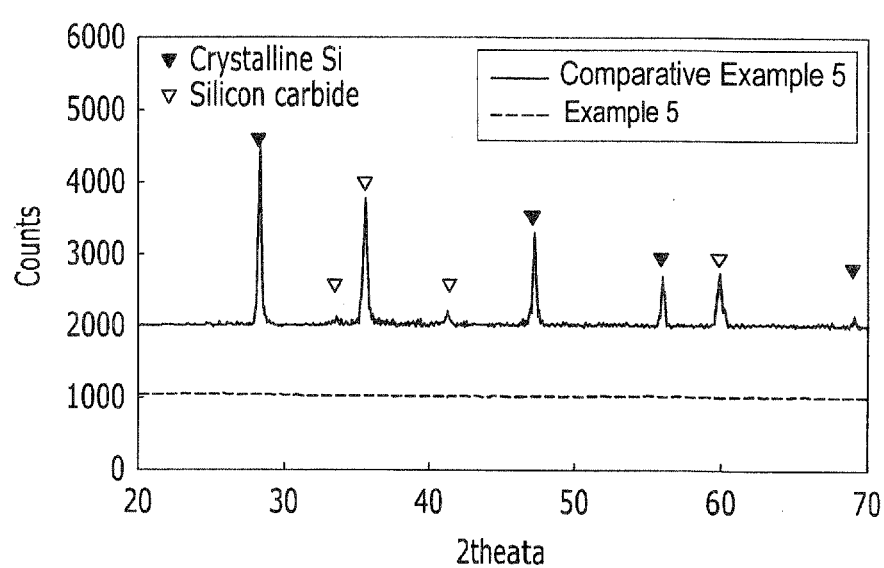
FIG. 2 is a graph showing XRD of the amorphous $SiC_x$ (x=0.7) material (before the carbon coating) of Example 5 and the crystalline $SiC_x$ (x=0.7) material (before the carbon coating) of Comparative Example 5.

The XRD analysis result of the amorphous $SiC_x$ (x=0.7) material (before the carbon coating) of Example 5 and the crystalline $SiC_x$ (x=0.7) material (before the carbon coating) of Comparative Example 5 measured using a CuK α were shown in the FIG. 2.

As shown in FIG. 2, a crystal-based Si and a silicon carbide peak was not identified from the amorphous $SiC_x$ (x=0.7) material of Example 5, while on the contrary, a crystal-based Si and a silicon carbide peak was identified from the crystalline $SiC_x$ (x=0.7) material of Comparative Example 5.

Figure 3:
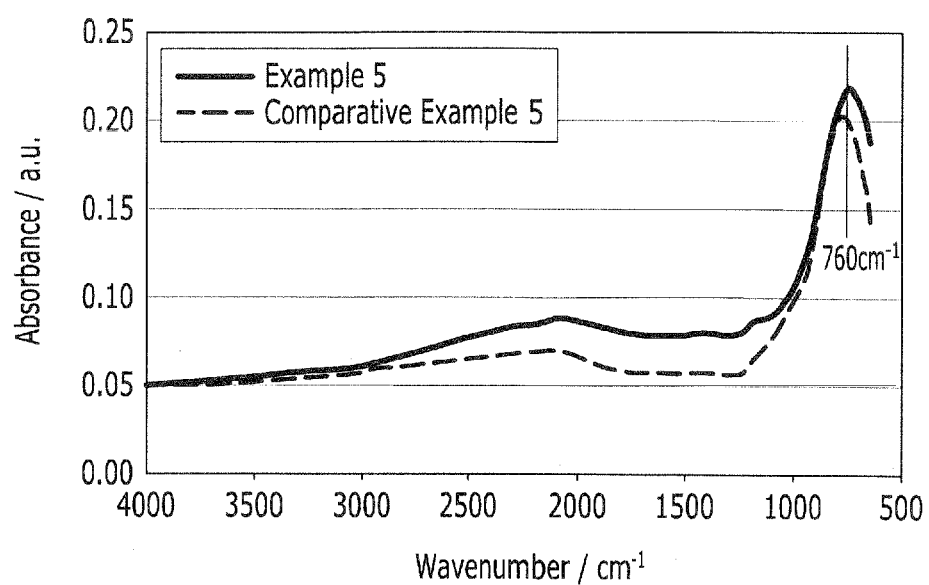
FIG. 3 is a graph showing FT-IR analysis results of the amorphous $SiC_x$ (x=0.7) material (before the carbon coating) according to Example 5 and the crystalline $SiC_x$ (x=0.7) material (before the carbon coating) according to Comparative Example 5.

The FT-IR analysis results of the amorphous $SiC_x$ (x=0.7) material (before the carbon coating) according to Example 5 and the crystalline $SiC_x$ (x=0.7) material (before the carbon coating) according to Comparative Example 5 were shown in FIG. 3. As shown in FIG. 3, according to the IR results, a Si—C covalent bond may be identified to have a peak at around 760 $cm^{-1}$.

As shown in FIGS. 2 and 3, the amorphous $SiC_x$ (x=0.7) material of Example 5 had an amorphous structure instead of the crystal structure due to uniform dispersion of Si and C, but, crystalline $SiC_x$ (x=0.7) material of Comparative Example 5 included separated silicon and silicon carbide, which are non-uniformly dispersed therein.

As shown in FIG. 3, the 760 $cm^{-1}$ peak of crystalline $SiC_x$ (x=0.7) prepared according to Comparative Example 5 was determined to be a peak originated from silicon carbide.

As shown in FIGS. 2 and 3, the non-uniform structure of a particle may deteriorate cycle-life characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material layer comprising a negative active material for a rechargeable lithium battery, the negative active material comprising:
a silicon-containing compound of Formula 1:

$$SiC_x \quad \text{[Formula 1]}$$

wherein 0.05≤x≤1.5;
wherein the negative active material being particulate in form and comprising a plurality of particles, and
wherein carbon and silicon have a relationship of a concentration ratio satisfying the Equation 1:

$$A>B \quad \text{[Equation 1]}$$

where A is a mole concentration ratio of carbon relative to silicon in a center of each particle; and
B is a mole concentration ratio of carbon relative to silicon on surface area of each particle; and
the silicon having a concentration gradient from the surface area to the center of the negative active material, wherein the concentration gradient exists from the surface area of each particle to the center of each particle, wherein each particle has a spherical shape, wherein A is 0.92 and corresponds to the center of each particle, and B is 0.25 and corresponds to the surface area of each particle.

2. The negative active material layer for a rechargeable lithium battery of claim 1, wherein the value of x is ranges from 0.25 to 0.95.

3. The negative active material layer for a rechargeable lithium battery of claim 1, wherein the silicon-containing compound of the negative active material is amorphous, wherein the negative active material layer comprises a plurality of spherical negative active material particles.

4. The negative active material layer for a rechargeable lithium battery of claim 1, wherein the silicon-containing compound of the negative active material comprises a carbon layer on an outer surface area.

5. The negative active material layer for a rechargeable lithium battery of claim 4, wherein the amount of the carbon layer included ranges from 5 wt % to 20wt % based on the total weight of the silicon-containing compound and the carbon layer of the negative active material, wherein the carbon layer of the negative active material has a thickness ranging from about 10 nm to about 50 nm.

6. A rechargeable lithium battery, comprising:
a negative electrode including a negative active material layer arranged on a current collector, the negative active material layer including a negative active material comprising a silicon-containing compound of Formula 1:

$SiC_x$ [Formula 1]

wherein, $0.05 \leq x \leq 1.5$;
wherein the negative active material being particulate in form and comprising a plurality of particles, and
wherein carbon and silicon have a relationship of a concentration ratio satisfying the Equation 1:

A>B [Equation 1]

where A is a mole concentration ratio of carbon relative to silicon in a center of each particle; and
B is a mole concentration ratio of carbon relative to silicon on a throughout an entirety of an outer surface area of each particle;
the silicon having a concentration gradient from the outer surface area to the center of the negative active material, wherein the concentration gradient exists from the surface area of each particle to the center of each particle, wherein each particle has a spherical shape, wherein A is 0.92 and corresponds to the center of each particle, and B is 0.25 and corresponds to the surface area of each particle;
a positive electrode including a positive active material; and
a non-aqueous electrolyte.

7. The rechargeable lithium battery of claim 6, wherein the value of the x ranges from 0.25 to 0.95.

8. The rechargeable lithium battery of claim 6, wherein each negative active material particle comprises a carbon layer on an outer surface.

9. The rechargeable lithium battery of claim 8, wherein the amount of the carbon layer included ranges from 5 wt % to 20 wt % based on the total weight of the silicon-containing compound and the carbon layer of the negative active material, wherein the carbon layer of the negative active material has a thickness ranging from about 10 nm to about 50 nm.

* * * * *